USO10698627B2

United States Patent
Hara et al.

(10) Patent No.: US 10,698,627 B2
(45) Date of Patent: Jun. 30, 2020

(54) STORAGE SYSTEM AND STORAGE CONTROL METHOD

(71) Applicant: HITACHI, LTD., Tokyo (JP)

(72) Inventors: Akihiro Hara, Tokyo (JP); Akira Yamamoto, Tokyo (JP); Masakuni Agetsuma, Tokyo (JP); Hideo Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/119,091

(22) Filed: Aug. 31, 2018

(65) Prior Publication Data

US 2019/0212937 A1 Jul. 11, 2019

(30) Foreign Application Priority Data

Jan. 11, 2018 (JP) ................... 2018-003008

(51) Int. Cl.
*G06F 3/06* (2006.01)
*G06F 16/11* (2019.01)
*G06F 16/185* (2019.01)

(52) U.S. Cl.
CPC ............ *G06F 3/0646* (2013.01); *G06F 3/061* (2013.01); *G06F 3/0683* (2013.01); *G06F 16/128* (2019.01); *G06F 16/185* (2019.01)

(58) Field of Classification Search
CPC ....... G06F 3/0646; G06F 3/061; G06F 3/0683
See application file for complete search history.

(56) References Cited

U.S. PATENT DOCUMENTS

| 9,830,105 | B1* | 11/2017 | Tummala | G06F 3/0647 |
| 2009/0193206 | A1 | 7/2009 | Ishii et al. | |
| 2015/0186070 | A1* | 7/2015 | Miller | G06F 11/2069 711/162 |

* cited by examiner

*Primary Examiner* — Edward J Dudek, Jr.
(74) *Attorney, Agent, or Firm* — Volpe and Koenig, P.C.

(57) ABSTRACT

A storage system as a storage cluster recognized as one storage device with respect to a host system specifies a primary volume, to which one or more snapshot volumes are associated, as a migration source primary volume and performs migration processing of migrating at least the migration source primary volume from among the migration source primary volume and a part of the snapshot volumes from a migration source storage device (storage device including specified migration source primary volume and one or more snapshot volume) to a migration target storage device.

11 Claims, 18 Drawing Sheets

| LOCAL VOL-ID | TYPE | PARENT LOCAL VOL-ID | GENERATION NUMBER | TRANSFER TARGET NODE ID | TRANSFER TARGET LOCAL VOL-ID | ACCESS RESTRICTION |
|---|---|---|---|---|---|---|
| 501 | 502 | 503 | 504 | 505 | 506 | 507 |
| ... | ... | ... | ... | ... | ... | ... |

| GLOBAL VOL-ID | NODE ID | LOCAL VOL-ID | TYPE | PARENT GLOBAL VOL-ID | GENERATION NUMBER | TRANSFER TARGET NODE ID | TRANSFER TARGET LOCAL VOL-ID | ACCESS RESTRICTION |
|---|---|---|---|---|---|---|---|---|
| ... | ... | ... | ... | ... | ... | ... | ... | ... |
| 601 | 602 | 603 | 604 | 605 | 606 | 607 | 608 | 609 |

FIG. 8

LOCAL MANAGEMENT TABLE #1

| 501 | 502 | 503 | 504 | 505 | 506 | 507 |
|---|---|---|---|---|---|---|
| 1 | PVOL | - | - | - | - | PERMISSION TO HOST #1 |
| 2 | SS-VOL | 1 | 1 | - | - | PERMISSION TO HOST #1 |
| 3 | SS-VOL | 1 | 2 | - | - | PERMISSION TO HOST #1 |

LOCAL MANAGEMENT TABLE #2

| 501 | 502 | 503 | 504 | 505 | 506 | 507 |
|---|---|---|---|---|---|---|
| - | - | - | - | - | - | - |

GLOBAL MANAGEMENT TABLE #2

| 601 | 602 | 603 | 604 | 605 | 606 | 607 | 608 | 609 |
|---|---|---|---|---|---|---|---|---|
| 8 | 1 | 1 | PVOL | - | - | - | - | PERMISSION TO HOST #1 |
| 1 | 1 | 2 | SS-VOL | 8 | 1 | - | - | PERMISSION TO HOST #1 |
| 2 | 1 | 3 | SS-VOL | 8 | 2 | - | - | PERMISSION TO HOST #1 |

BEFORE MIGRATION PROCESSING

FIG. 9

LOCAL MANAGEMENT TABLE #1

| 501 | 502 | 503 | 504 | 505 | 506 | 507 |
|---|---|---|---|---|---|---|
| 1 | PVOL | - | - | - | - | ACCESS PROHIBITED |
| 2 | SS-VOL | 1 | 1 | - | - | PERMISSION TO HOST #1 |
| 3 | SS-VOL | 1 | 2 | - | - | PERMISSION TO HOST #1 |

LOCAL MANAGEMENT TABLE #2

| 501 | 502 | 503 | 504 | 505 | 506 | 507 |
|---|---|---|---|---|---|---|
| 2 | PVOL | - | - | - | - | PERMISSION TO HOST #1 |
| 3 | SS-VOL | 2 | 1 | - | - | PERMISSION TO HOST #1 |

GLOBAL MANAGEMENT TABLE #2

| 601 | 602 | 603 | 604 | 605 | 606 | 607 | 608 | 609 |
|---|---|---|---|---|---|---|---|---|
| 8 | 2 | 2 | PVOL | - | - | - | - | PERMISSION TO HOST #1 |
| 1 | 1 | 2 | SS-VOL | 8 | 1 | - | - | PERMISSION TO HOST #1 |
| 2 | 1 | 3 | SS-VOL | 8 | 2 | - | - | PERMISSION TO HOST #1 |
| 3 | 2 | 3 | SS-VOL | 8 | 3 | - | - | PERMISSION TO HOST #1 |

AFTER MIGRATION PROCESSING

FIG. 10
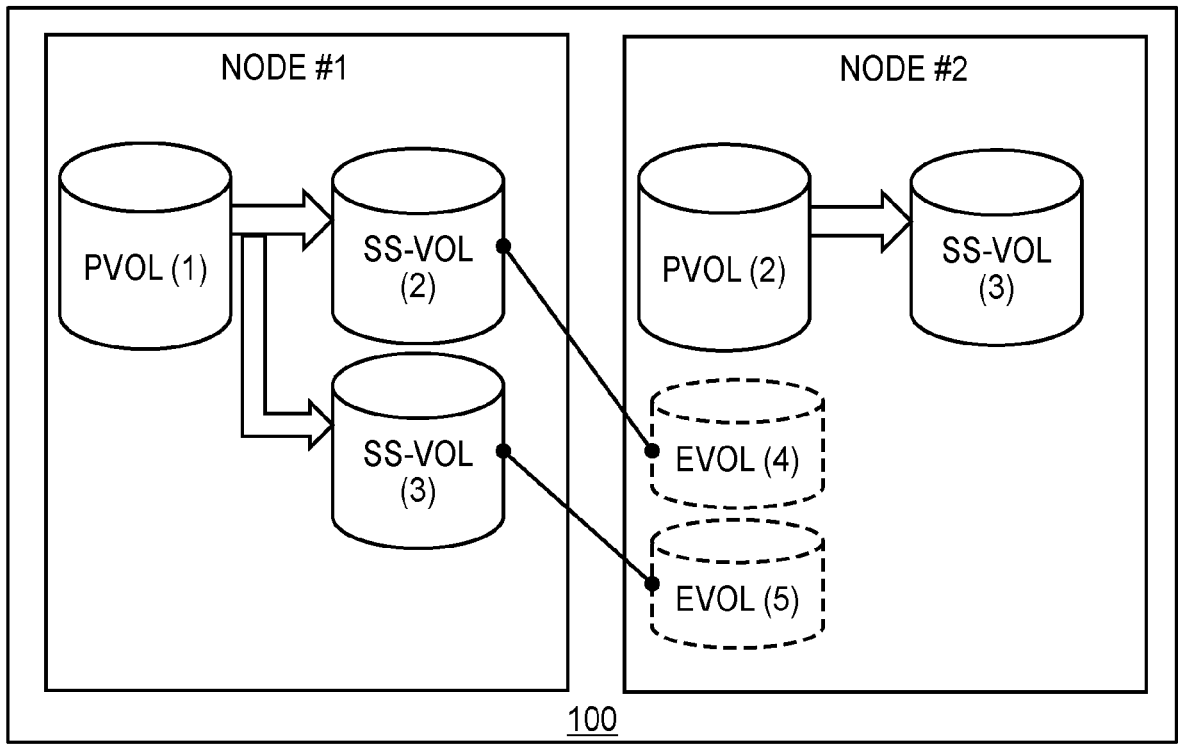
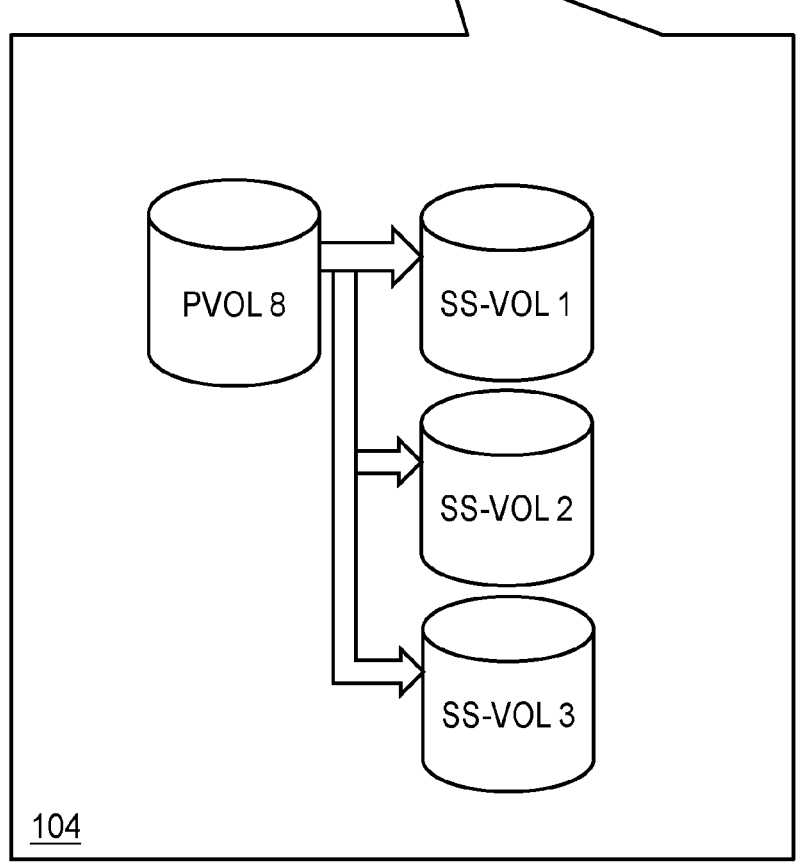

FIG. 11

LOCAL MANAGEMENT TABLE #1

| 501 | 502 | 503 | 504 | 505 | 506 | 507 |
|---|---|---|---|---|---|---|
| 1 | PVOL | - | - | - | - | ACCESS PROHIBITED |
| 2 | SS-VOL | 1 | 1 | - | - | PERMISSION TO NODE #2 |
| 3 | SS-VOL | 1 | 2 | - | - | PERMISSION TO NODE #2 |

LOCAL MANAGEMENT TABLE #2

| 501 | 502 | 503 | 504 | 505 | 506 | 507 |
|---|---|---|---|---|---|---|
| 2 | PVOL | - | - | - | - | PERMISSION TO HOST #1 |
| 3 | SS-VOL | 1 | 1 | - | - | PERMISSION TO HOST #1 |
| 4 | EVOL | - | - | 1 | 2 | PERMISSION TO HOST #1 |
| 5 | EVOL | - | - | 1 | 3 | PERMISSION TO HOST #1 |

GLOBAL MANAGEMENT TABLE #2

| 601 | 602 | 603 | 604 | 605 | 606 | 607 | 608 | 609 |
|---|---|---|---|---|---|---|---|---|
| 8 | 2 | 2 | PVOL | - | - | - | - | PERMISSION TO HOST #1 |
| 1 | 1 | 2 | EVOL | 8 | 1 | 1 | 2 | PERMISSION TO HOST #1 |
| 2 | 1 | 3 | EVOL | 8 | 2 | 1 | 3 | PERMISSION TO HOST #1 |
| 3 | 2 | 3 | SS-VOL | 8 | 3 | - | - | PERMISSION TO HOST #1 |

AFTER EXTERNAL CONNECTION

FIG. 19

LOCAL MANAGEMENT TABLE #1

| 501 | 502 | 503 | 504 | 505 | 506 | 507 |
|---|---|---|---|---|---|---|
| 1 | PVOL | - | - | - | - | ACCESS PROHIBITED |
| 2 | SS-VOL | 1 | 1 | - | - | PERMISSION TO HOST #1 |
| 3 | SS-VOL | 1 | 2 | - | - | PERMISSION TO HOST #1 |

LOCAL MANAGEMENT TABLE #2

| 501 | 502 | 503 | 504 | 505 | 506 | 507 |
|---|---|---|---|---|---|---|
| 2 | PVOL | - | - | - | - | PERMISSION TO HOST #1 |
| 3 | SS-VOL | 2 | 1 | - | - | PERMISSION TO HOST #1 |
| 4 | SS-VOL | 3 | 1 | - | - | PERMISSION TO HOST #1 |
| 5 | SS-VOL | 4 | 1 | - | - | PERMISSION TO HOST #1 |

GLOBAL MANAGEMENT TABLE #2

| 601 | 602 | 603 | 604 | 605 | 606 | 607 | 608 | 609 |
|---|---|---|---|---|---|---|---|---|
| 8 | 2 | 2 | PVOL | - | - | - | - | PERMISSION TO HOST #1 |
| 1 | 1 | 2 | SS-VOL | 8 | 1 | - | - | PERMISSION TO HOST #1 |
| 2 | 1 | 3 | SS-VOL | 8 | 2 | - | - | PERMISSION TO HOST #1 |
| 3 | 2 | 3 | SS-VOL | 8 | 3 | - | - | PERMISSION TO HOST #1 |
| 4 | 2 | 4 | SS-VOL | 3 | 1 | - | - | PERMISSION TO HOST #1 |
| 5 | 2 | 5 | SS-VOL | 4 | 1 | - | - | PERMISSION TO HOST #1 |

AFTER CASCADE CONNECTION

STORAGE SYSTEM AND STORAGE CONTROL METHOD

BACKGROUND OF THE INVENTION

1. Field of the Invention

An embodiment of the present invention generally relates to data migration between storage devices.

2. Description of the Related Art

A technology of migrating data between storage devices has been known. US 2009/0193206 discloses the following. A migration source storage device manages a migration source volume and a migration source snapshot volume. A migration target volume and a migration target snapshot volume respectively corresponding to the migration source volume and the migration source snapshot volume are prepared in a migration target storage device. An update history of a migration object generation is reproduced as processing of writing difference data into the migration target volume.

SUMMARY OF THE INVENTION

In a storage system in which a snapshot of a logical volume is managed in a migration source storage device, an amount of copied data is large when it is necessary to copy, to a migration target storage device, all pieces of difference data managed as snapshots along with all pieces of data in the logical volume. Thus, there is a possibility that a band between the storage devices is consumed.

A storage system as a storage cluster recognized as one storage device with respect to a host system specifies a primary volume, to which one or more snapshot volumes are associated, as a migration source primary volume. Each of the one or more snapshot volumes associated to the migration source primary volume stores difference data as a difference from the migration source primary volume in a generation corresponding to the snapshot volume. The storage system performs migration processing of migrating at least the migration source primary volume from among the migration source primary volume and a part of the snapshot volumes to a migration target storage device from a migration source storage device (storage device including specified migration source primary volume and one or more snapshot volume).

Regardless of which of one or more snapshot volumes and a primary volume to which the one or more snapshot volumes are associated is to be migrated, only the primary volume between the primary volume and the one or more snapshot volumes needs to be migrated. Thus, it is possible to reduce an amount of copied data.

BRIEF DESCRIPTION OF THE DRAWINGS

FIG. 5 is a table illustrating a configuration of a local management table;
FIG. 6 is a table illustrating a configuration of a global management table;
FIG. 8 is a view illustrating the local management table and the global management table before the migration processing;
FIG. 9 is a view illustrating the local management table and the global management table after the migration processing;
FIG. 10 is a view illustrating the local VOL configuration and the global VOL configuration after EVOL creating processing is performed after the migration processing;
FIG. 11 is a view illustrating the local management table and the global management table after the EVOL creating processing is performed after the migration processing;
FIG. 19 is a view illustrating the local management table and the global management table after the cascade connection is made after the migration processing.

DESCRIPTION OF THE PREFERRED EMBODIMENTS

Figure 1:
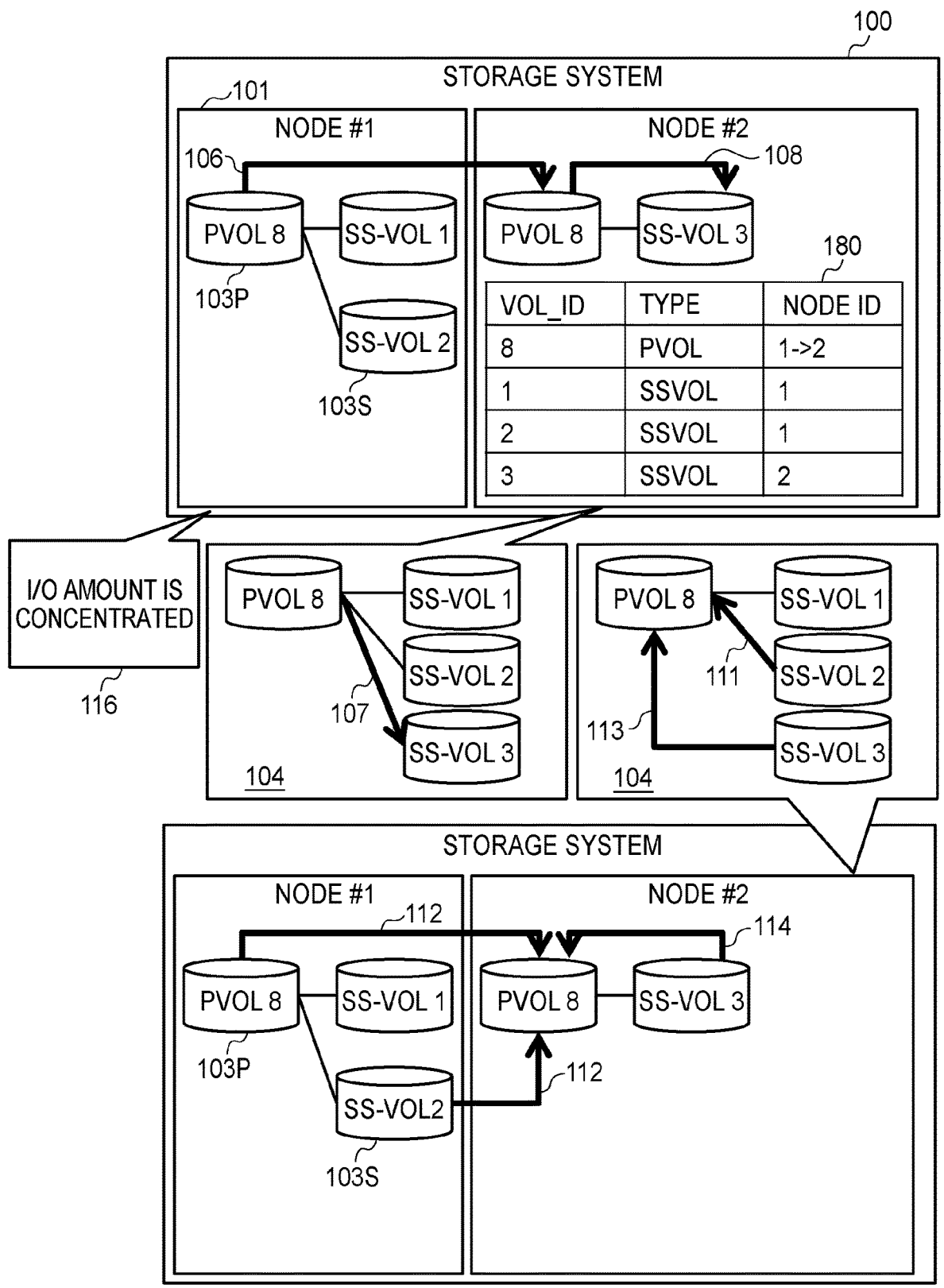
FIG. 1 is a view illustrating a configuration of a storage system according to an embodiment.

In the following description, an "interface unit" may be one or more interfaces. The one or more interfaces may be one or more same kind of communication interface devices (such as one or more network interface card (NIC)) or may be two or more different kinds of communication interface devices (such as NIC and host bus adapter (HBA)).

Also, in the following description, a "memory unit" is one or more memories and may be typically a main storage device. At least one memory in the memory unit may be a volatile memory or a non-volatile memory.

Also, in the following description, a "PDEV unit" is one or more PDEVs and may be typically an auxiliary storage device. The "PDEV" means a physical storage device and is typically a non-volatile storage device such as a hard disk drive (HDD) or a solid state drive (SSD).

Also, in the following description, a "storage unit" is at least one of the memory unit and the PDEV unit (typically, at least memory unit).

Also, in the following description, a "processor unit" is one or more processors. The at least one processor is typically a microprocessor such as a central processing unit (CPU) but may be a different kind of processor such as a graphics processing unit (GUP). The at least one processor may have a single core or multiple cores. The at least one processor may be a processor in a broad sense such as a hardware circuit (such as field-programmable gate array (FPGA) or application specific integrated circuit (ASIC)) that performs a part or whole of processing.

Also, in the following description, there is a case where information is described by an expression such as an "xxx table." However, the information may be expressed in any kind of data structure. That is, in order to indicate that the information does not depend on a data structure, it is possible to call an "xxx table" as "xxx information." Also, in the following description, a configuration of each table is an example. One table may be divided into two or more tables or a whole or a part of two or more tables may be one table.

Also, in the following description, there is a case where processing is described with a "program" as a subject. However, since the program performs determined processing while arbitrarily using a memory unit and/or an interface unit or the like by being executed by a processor unit, a subject of the processing may be the processor unit (or device such as controller including the processor unit). The program may be installed from a program source into a device such as a computer. The program source may be, for example, a program distribution server or a computer-readable (for example, non-transitory) recording medium. Also, in the following description, two or more programs may be realized as one program or one program may be realized as two or more programs.

Also, in the following description, a "VOL" is an abbreviation for a logical volume and may be a logical storage device. The VOL may be a real VOL (RVOL) or a virtual VOL (VVOL). The "RVOL" may be a VOL based on a physical storage resource (such as one or more RAID group) included in a storage system that provides the RVOL. The "VVOL" may be any of an external connection VOL (EVOL), a thin provisioning VOL (TPVOL), and a snapshot VOL (SS-VOL). The EVOL may be a VOL that is based on a storage space (such as VOL) of an external storage system and that follows a storage virtualization technology. The TPVOL may be a VOL that includes a plurality of virtual areas (virtual storage area) and that follows a capacity virtualization technology (typically, thin provisioning). The SS-VOL may be a VOL provided as a snapshot of an original VOL. The SS-VOL may be an RVOL. Typically, the SS-VOL is regarded as a secondary VOL with an original VOL as a primary VOL (PVOL). A "pool" is a logical storage area (such as aggregation of plurality of pool VOL) and may be prepared for each use. For example, there may be at least one of a TP pool and a snapshot pool as the pool. The TP pool may be a storage area including a plurality of real areas (real storage area). In a case where a real area is not assigned to a virtual area (virtual area of TPVOL) to which an address designated by a write request received from a host system belongs, the storage system assigns a real area to the virtual area (write destination virtual area) from the TP pool (real area may be newly assigned to write destination virtual area even when different real area is already assigned to write destination virtual area). The storage system may write data to be written associated with the write request to the assigned real area. The snapshot pool may be a storage area in which data saved from the PVOL is stored. One pool may be used as both of the TP pool and the snapshot pool. The "pool VOL" may be a VOL that is a configuration element of the pool. The pool VOL may be an RVOL or an EVOL.

Also, in the following description, a "host system" is one or more physical or virtual host computers.

Also, in the following description, a "storage cluster" corresponds to one storage device recognized by a host system and materially corresponds to a storage system. The "storage system" includes one or more physical storage devices. The "storage device" only needs to be a device including a storage unit and may be a general-use computer. The at least one physical storage device may execute a virtual computer (such as virtual machine (VM)) or may execute software-defined anything (SDx). As the SDx, for example, a software defined storage (SDS) (example of virtual storage device) or software-defined datacenter (SDDC) can be employed. For example, a virtual computer as a host system, and a virtual computer as a storage device (storage controller) that receives an I/O request from the host system and performs processing may be executed in the same storage device. Also, the storage system may include a redundant configuration group. Examples of a redundant configuration include a configuration with a plurality of nodes such as erasure coding, a redundant array of independent nodes (RAIN), and mirroring between nodes and a configuration in a single node such as one or more redundant array of independent (or Inexpensive) disks (RAID) groups including PDEV units.

Also, in the following description, a reference sign is used in a case where a description is made without a distinction between the same kind of elements, and an ID (such as identification number) of an element is used in a case where a description is made with a distinction between the same kind of elements. For example, a storage node (node, in the following) will be described as a "node 101" in a case of being described without a distinction. Individual nodes may be described as a "node #1," a "node #2," and the like in a case of being described with a distinction. Also, in the following description, by adding # n to a name of an element in a node # n (n is natural number), it is possible to distinguish an element of the node.

In the following, an embodiment of the present invention will be described on the basis of the drawings. Note that the present invention is not limited to the embodiment described in the following.

FIG. 1 is a view illustrating a configuration of a storage system according to an embodiment.

A storage system 100 includes one or more nodes 101 (example of one or more storage device). Typically, there is a plurality of nodes 101. The storage system 100 may be a distributed storage system such as a scale-out storage system including the plurality of nodes 101. In the following, it is assumed that a node #1 is a migration source node and a node #2 is a migration target node. The node #2 may be the storage system 100, or a plurality of nodes including the node #1 and the node #2 may be the storage system 100.

In the present embodiment, a computer program causes a computer to execute (X) and (Y) in the following. Note that the "computer" here may be any of the nodes 101 (such as node #1 or node #2) or a computer connected to the storage system (such as management computer or host computer). In the present embodiment, the computer is any of the nodes 101, and the computer program may be a cluster management program 405 (described later). Also, in the following, each of one or more SS-VOLs associated to a migration source PVOL stores difference data as a difference from the migration source PVOL in a generation corresponding to the SS-VOL. Actually, the difference data is stored in a pool (snapshot pool).

(X) A PVOL 103P to which one or more SS-VOLs 103S are associated is specified as a migration source PVOL 103P in a storage system 100 as a storage cluster recognized as one node with respect to a host system (host, in the following).

(Y) Migration processing (see sign 106) to migrate only the migration source PVOL 103P from among the migration source PVOL 103P and the one or more SS-VOLs 103S to the node #2 from the node #1 including the specified migration source PVOL 103P and the one or more SS-VOLs 103S is performed.

Accordingly, the migration processing is performed by migration of only the PVOL 103P regardless of which of the one or more SS-VOLs 103S and the PVOL 103P to which the one or more SS-VOLs 103S are associated is a migration object. Thus, it is possible to reduce an amount of copied data. As a detailed example, a case where it is intended to migrate the PVOL 103P to the node #2 in order to distribute a load or a case where generation management to create a new SS-VOL 103S at certain intervals (and, for example, to delete SS-VOL 103P corresponding to old generation along with new creation of SS-VOL 103S) is performed in the storage system 100 is considered. It is possible to reduce an amount of copied data in such cases. Note that in a case where the above-described migration processing, it looks as if a use capacity of the node #2 is increased for a capacity of PVOL 103S.

The node #2 that is an example of a master node 101 in the storage system 100 provides, to the host, a cluster view 104 that is a view of a VOL configuration in the storage cluster. The cluster view 104 displays the VOL configuration in the storage cluster (storage system 100). For example, the node #2 includes, for each VOL, a management table 180 indicating a VOL-ID (ID of VOL), a type, and a node ID (ID of node in which VOL exist). The node #2 sets a migration target PVOL 8, which is a PVOL 8 migrated to the node #2 by migration processing, as a PVOL in the storage cluster after the migration processing (see, for example, first record of management table 180). In other words, the node #2 leaves the migration source PVOL 103P and each of the SS-VOLs 103S in the node #1 and manages, in the node #2, a relationship between a migration target PVOL 103P and the SS-VOLs 103S in the node #1. The node #2 maintains a VOL configuration shown to the host after the migration processing as a VOL configuration shown to the host before the migration processing. Accordingly, it is possible to perform the above-described data amount reduction (reduction of amount of copied data) without changing operation of snapshot management by a user (on host side). Note that the cluster view 104 is, for example, a graphical user interface (GUI). Also, in the cluster view 104, the VOL configuration may be a tree structure with the PVOL 103S as a root. With respect to each of the SS-VOLs 103S, information indicating oldness of a generation such as a snapshot number (older generation has smaller number) or snapshot acquisition time may be displayed. The snapshot number may correspond to a global VOL-ID of each of the SS-VOLs 103S. The global VOL-ID may be a unique ID in the storage cluster. In different nodes 101, there may be the same local VOL-IDs.

The storage system 100 receives, from a host, a request for creating or deleting a VOL with respect to the storage cluster on the basis of a VOL configuration (that is, through cluster view 104). That is, a user can request creation or deletion of a VOL without considering which VOL exists in which node 101.

For example, in a case where a request for creation of a new SS-VOL (see sign 107) is received after the migration processing, the node #2 creates a new SS-VOL 103S associated to the PVOL 103P in the node #2 (see sign 108). Accordingly, it is possible to prevent an increase of the SS-VOLs 103S in the node #1 with respect to the PVOL 103P after the migration processing. Thus, as it is understood from the following description, at least one of improvement in efficiency of restoration and improvement in efficiency of a capacity can be expected.

In a case where a restoration request in which a PVOL in a generation corresponding to an SS-VOL 2 (SS-VOL of snapshot number "2") that exists before the migration processing is a restoration object (see sign 111) is received (for example, through cluster view 104), the node #2 copies difference data in the SS-VOL 2 and all pieces of data referred to by the SS-VOL 2 (such as data in migration source PVOL 103P) from the node #1 to the node #2 (typically, migration target PVOL 103P or replicated VOL thereof) (see sign 112). In such a manner, in a case where an SS-VOL corresponding to a generation of a restoration object is in the node #1, an amount of copied data in restoration is large. On the other hand, in a case where a restoration request in which a PVOL in a generation corresponding to an SS-VOL 3 created after the migration processing is a restoration object (see sign 113) is received, the node #2 copies difference data in the SS-VOL 2 and difference data in the SS-VOL 3 in the node #2 (typically to migration target PVOL 103P or replicated VOL thereof) (see sign 114). In such a manner, in a case where an SS-VOL corresponding to a generation of a restoration object is in the node #2, data copied in restoration is only the difference data. Thus, an amount of copied data is relatively small. It is considered that an SS-VOL corresponding to an old generation is not likely to be set as a restoration object (is likely to be deleted, for example). As described above, since a new SS-VOL is created in the node #2 after the migration processing, it is expected that a possibility that restoration takes time is decreased.

The above-described migration processing may be performed in a case where an explicit migration request in which any of one or more SS-VOLs 103S and a PVOL 103P to which the one or more SS-VOLs 103S are associated is a migration object is received (for example, from management computer) or may be performed automatically (for example, in background processing) without reception of such a migration request. For example, each of the plurality of nodes 101 may measure an I/O amount (such as I/O amount in unit time) of the node 101 and the node #2 may specify a node #1, in which the I/O amount is relatively concentrated, from the plurality of nodes 101 (see sign 116). In a case where a PVOL 103P is in the specified node #1, the node #2 may specify the PVOL 103P as a migration source PVOL 103P and perform the above-described migration processing. In a case where the migration processing is performed in such a manner, the I/O amount is distributed between the node #1 and the node #2. Thus, the migration processing can also works for load distribution. Note that an "I/O amount" of a node 101 may be an amount of I/O according to one or more I/O requests with respect to the node 101. As the "I/O amount," at least one of the "number of times of I/O" and an "I/O size" can be employed. The "number of times of I/O" may be the number of I/O requests. The "I/O size" may be a size (such as total size, maximum size, or average size) of data of an I/O object according to all I/O requests of a measurement object.

Also, in the present embodiment, at least one of the following may be performed.

A part of the SS-VOLs 103S may be migrated from the node #1 to the node #2 in addition to the PVOL 103P in the migration processing. It is possible to maintain reduction of an amount of copied data compared to a case where all of the SS-VOLs 103S associated to the PVOL 103P are migrated in addition to the PVOL 103P.

The PVOL 103P (and part of SS-VOL 103S) is migrated in the migration processing. Difference data in a remaining SS-VOL 103S may be gradually migrated to the node #2 when a load of both (or one) of the nodes #1 and #2 is small after the migration processing.

A path between an SS-VOL 103S remaining in the node #1 and the host is maintained after the migration processing. Accordingly, the host issues an I/O request to the node #1 for I/O with respect to the remaining SS-VOL associated to the migrated PVOL.

After the migration processing, an EVOL corresponding to the SS-VOL 103S remaining in the node #1 is prepared in the node #2 and a path is formed between the EVOL and the host. Accordingly, the host issues an I/O request (I/O request designating EVOL) to the node #2 for I/O with respect to the remaining SS-VOL associated to the migrated PVOL.

After the migration processing, difference data in the SS-VOL 103S remaining in the node #1 is written back to at least one of a migration target PVOL in the node #2 and a migration source PVOL remaining in the node #1.

In the following, the present embodiment will be described in detail.

Figure 2:
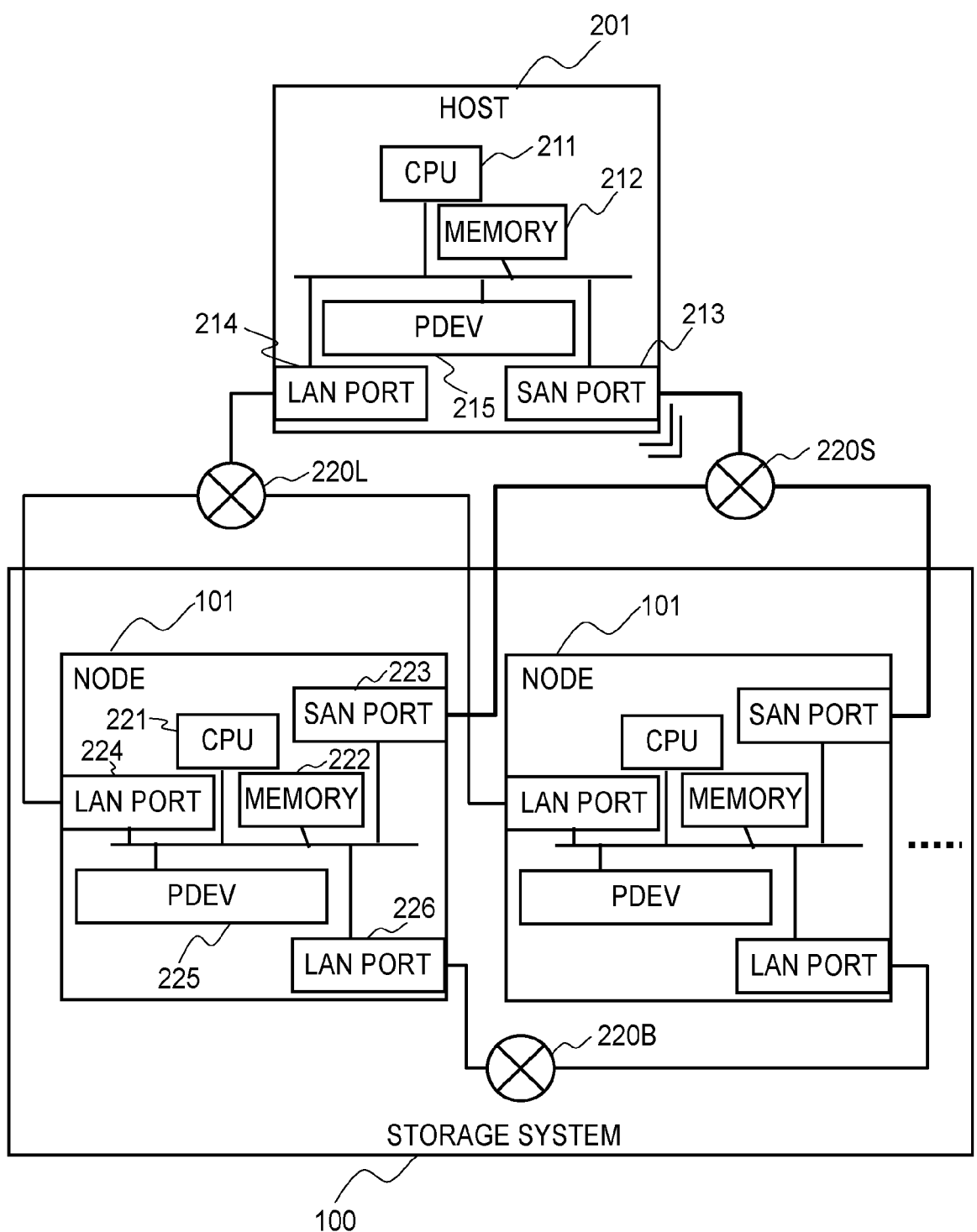
FIG. 2 is a view illustrating a configuration of a whole system including the storage system.

FIG. 2 is a view illustrating a configuration of a whole system including a storage system 100.

The storage system 100 performs I/O with respect to a VOL on the basis of an I/O request from a host 201. The storage system 100 includes a plurality of nodes 101 connected to a network 220. Examples of the network 220 include a front-end network such as a storage area network (SAN) 220S and a local area network (LAN) 220L, and a back-end network such as a LAN 220B.

Each of the nodes 101 includes a SAN port 223, LAN ports 224 and 226, a PDEV 225, a memory 222, and a CPU 221 connected thereto. The SAN port 223 and the LAN ports 224 and 226 are examples of an interface unit. The PDEV 225 is an example of a PDEV unit. The memory 222 is an example of a memory unit. The CPU 221 is an example of a processor unit.

Each of one or more hosts 201 is connected to the LAN 220L and the SAN 220S that are examples of the front-end network. Each host 201 issues an I/O request designating an address that belongs to a VOL to the storage system 100. Each host 201 includes a SAN port 213, a LAN port 214, a PDEV 215, a memory 212, and a CPU 211 connected thereto.

Figure 3:
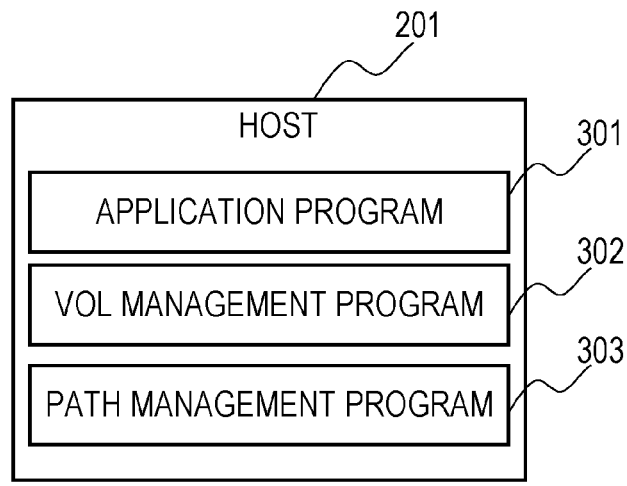
FIG. 3 is a view illustrating an example of a computer program executed in a host.

FIG. 3 is a view illustrating an example of a computer program executed in each host 201.

In each host 201, the memory 212 stores an application program 301, a VOL management program 302, and a path management program 303. The CPU 211 executes these programs 301 to 303.

The application program 301 issues an I/O request with respect to a VOL. The VOL management program 302 manages a VOL and a VOL-ID (global VOL-ID). The path management program 303 manages a path to a VOL (I/O path) such as a used path or an alternate path thereof. Note that the VOL management program 302 and the path management program 303 may switch a path to a VOL in response to an instruction from the storage system 100 (or management computer thereof).

Figure 4:
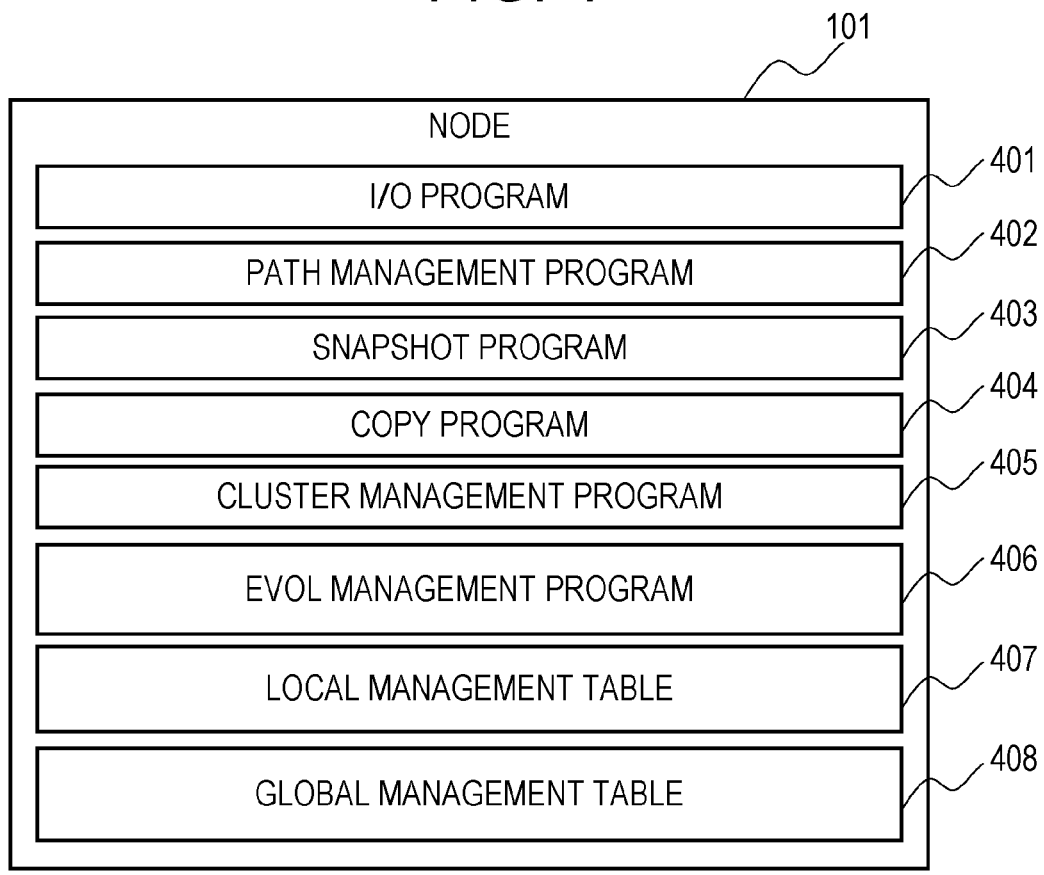
FIG. 4 is a view illustrating an example of a computer program executed in a node, and a table held by the node.

FIG. 4 is a view illustrating an example of a computer program executed in each node 101 and a table held by the node 101.

In each node 101, the memory 222 stores an I/O program 401, a path management program 402, a snapshot program 403, a copy program 404, a cluster management program 405, and an EVOL management program 406. The CPU 221 executes these programs 401 to 406. Also, the memory 222 stores a local management table 407 and a global management table 408. The global management table 408 corresponds to a detailed table of the management table 180 illustrated in FIG. 1. Note that a part of the programs (EVOL management program 406) in the node 101 may not exist (may be option).

The I/O program 401 processes an I/O request from a host 201. The path management program 402 controls which VOL is provided to which host 201 through which path. The snapshot program 403 creates and deletes an SS-VOL (snapshot). The copy program 404 performs migration of a PVOL (data copy). The cluster management program 405 manages a VOL configuration in a storage cluster. The cluster management program 405 exists, for example, in each node 101, is executed by a master node 101 (active), and is in a standby state (standby) in each node 101 other than the master node 101. The EVOL management program 406 creates and deletes an EVOL based on a designated VOL.

The local management table 407 holds information related to each VOL in the nodes 101. The global management table 408 holds information related to each VOL in the storage cluster. Information in the global management table 408 of each node 101 is maintained to be the same. More specifically, for example, in a case where the global management table 408 is updated in any of the nodes 101, the update is reflected on the global management table 408 of each of the other nodes 101.

FIG. 5 is a view illustrating a configuration of the local management table 407.

The local management table 407 includes a record for each VOL in a node 101 including the table 407. Each record stores information such as a local VOL-ID 501, a type 502, a parent local VOL-ID 503, a generation number 504, a transfer target node ID 505, a transfer target local VOL-ID 506, and an access restriction 507. In the following, one node 101 and one VOL are exemplified ("object node 101" and "object VOL" in description of FIG. 5).

The local VOL-ID 501 indicates a VOL-ID of an object VOL in an object node 101. The type 502 indicates a type of the object VOL (such as which of PVOL, SS-VOL, and EVOL). The parent local VOL-ID 503 indicates a local VOL-ID of a parent VOL of the object VOL. The generation number 504 indicates a number of a generation of the parent VOL managed by the object VOL. In the present embodiment, an older generation has a smaller number. Both of the transfer target node ID 505 and the transfer target local VOL-ID 506 are information effective in a case where the object VOL is an EVOL. The transfer target node ID 505 indicates an ID of a node (transfer target node) including a VOL (VOL to be base of EVOL) externally connected to the object VOL. The transfer target local VOL-ID 506 indicates a local VOL-ID of the VOL externally connected to the object VOL (VOL-ID in transfer target node). The access restriction 507 indicates restriction indicating an access of which host 201 or which node 101 is permitted or prohibited with respect to the object VOL. Permission or prohibition may be set for each access type such as writing or reading.

Note that the "parent VOL" is an original VOL of the object VOL (SS-VOL). The original VOL is typically a PVOL but may be an SS-VOL (that is, there is case where snapshot of SS-VOL is created) as described later. The object VOL is a "child VOL" with respect to the parent VOL. Also, any of the parent VOL of the object VOL and all parent VOLs preceding this can be called an "ancestor VOL" and any of a child VOL of the object VOL and all child VOLs following this can be called a "descendent VOL."

FIG. 6 is a table illustrating a configuration of the global management table 408.

The global management table 408 includes a record for each VOL in the storage cluster. Each record stores information such as a global VOL-ID 601, a node ID 602, a local VOL-ID 603, a type 604, a parent global VOL-ID 605, a generation number 606, a transfer target node ID 607, a transfer target local VOL-ID 608, and access restriction 609. In the following, one VOL is exemplified ("object VOL" in description of FIG. 6).

The global VOL-ID 601 indicates a VOL-ID of the object VOL in the storage cluster. The node ID 602 indicates an ID of a node including the object VOL. The local VOL-ID 603 indicates a local VOL-ID of the object VOL. The type 604 indicates a type of the object VOL. The parent global VOL-ID 605 indicates a global VOL-ID of a parent VOL of the object VOL. The generation number 606 indicates a number of a generation of the parent VOL managed by the object VOL. The transfer target node ID 607 indicates an ID of a node (transfer target node) including a VOL externally connected to the object VOL. The transfer target local VOL-ID 608 indicates a local VOL-ID of the VOL externally connected to the object VOL (VOL-ID in transfer target node). The access restriction 609 indicates restriction indicating an access of which host 201 or which node 101 is permitted or prohibited with respect to the object VOL. Permission or prohibition may be set for each access type such as writing or reading.

In the following, an example of processing performed in the present embodiment will be described.

Figure 7:
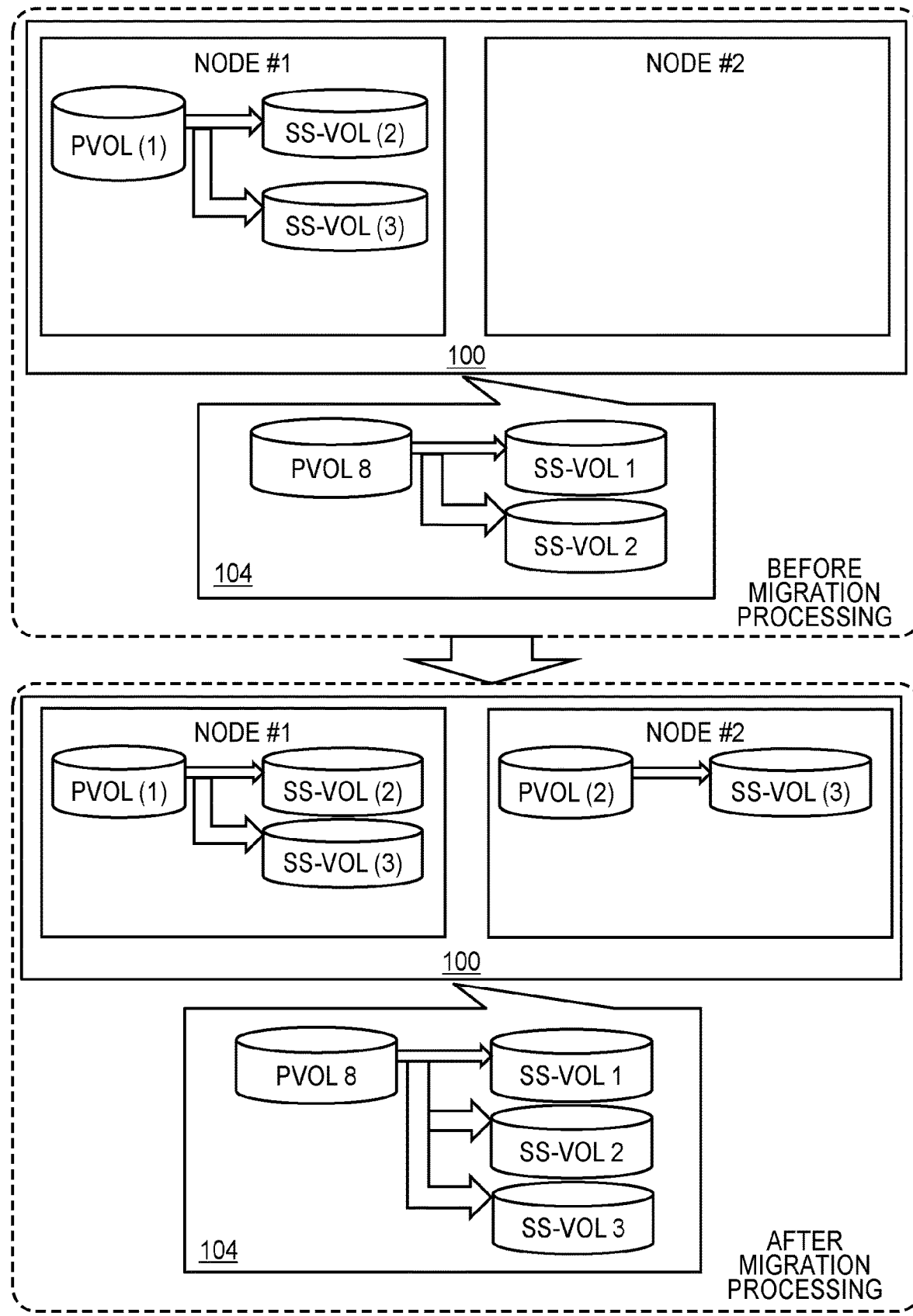
FIG. 7 is a view illustrating a local VOL configuration and a global VOL configuration before and after migration processing.

FIG. 7 is a view illustrating a local VOL configuration and a global VOL configuration before and after migration processing. FIG. 8 is a view illustrating local management tables #1 and #2 and a global management table #2 before the migration processing. FIG. 9 is a view illustrating the local management tables #1 and #2 and the global management table #2 after the migration processing. Note that in FIG. 7 (and FIG. 10 and FIG. 18), a number in parentheses of a VOL in the nodes #1 and #2 is a local VOL-ID and a number of a VOL in the cluster view 104 is a global VOL-ID (global VOL-ID is used and local VOL-ID is not used in FIG. 1 in order to simplify description). In the following, parentheses are used in a case where a VOL is indicated with a local VOL-ID, and parentheses are not used in a case where a VOL is indicated with a global VOL-ID. Also, as described above, with respect to a configuration element (such as table or program) in a node # n, # n may be used instead of a reference sign.

Before migration processing, a node #1 includes a PVOL (1) and SS-VOLs (2) and (3) that are snapshots of the PVOL (1). It is assumed that a node #2 includes no VOL. Thus, the table illustrated in FIG. 8 is held before the migration processing. The node #2 (example of master node) provides a cluster view 104 on the basis of a cluster management table #2. The cluster view 104 is provided, for example, by a cluster management program #2. In the cluster view 104, there are two SS-VOLs 1 and 2 with respect to a PVOL 8. The cluster view 104 is displayed, for example, on a host 201 a path of which is connected to the PVOL 8 (object host 201, in the following) or a management computer (not illustrated) of the storage system 100.

It is assumed that a VOL migration instruction designating an SS-VOL 1 is issued through the cluster view 104. The VOL migration instruction is received by the node #2. Migration processing is performed in response to the VOL migration instruction. The migration processing is in the following manner, for example. That is, on the basis of the global management table #2, the node #2 specifies that the SS-VOL 1 designated by the VOL migration instruction exists as an SS-VOL (2) in the node #1, and specifies, as a migration source PVOL, a PVOL (1) that is a parent VOL of the SS-VOL (2). The node #2 prepares the PVOL (2) corresponding to the PVOL (1) in the node #2. Data copy from the PVOL (1) in the node #1 to the PVOL (2) in the node #2 is performed by at least one of the nodes #1 and #2. Instead of the PVOL (1) in the node #1, the node #2 sets the PVOL (2) as the PVOL 8 (see FIG. 9).

It is assumed that a new snapshot creation instruction of the PVOL 8 is issued through the cluster view 104 after the migration processing. The snapshot creation instruction is received by the node #2. Snapshot creating processing is performed in response to the snapshot creation instruction. The snapshot creating processing is in the following manner, for example. That is, on the basis of the global management table #2, the node #2 specifies that a PVOL as the PVOL 8 exists in the node #2. The node #2 creates a new SS-VOL (3) with respect to the specified PVOL (2) in the node #2. Information related to the new SS-VOL (3) is also reflected on the local management table #2 and the global management table #2 (see FIG. 9). As a result, the SS-VOL (3) can be seen as a new SS-VOL 3 of the PVOL 8 on the cluster view 104.

FIG. 10 is a view illustrating a local VOL configuration and a global VOL configuration after EVOL creating processing is performed after the migration processing. FIG. 11 is a view illustrating the local management tables #1 and #2 and the global management table #2 after the EVOL creating processing is performed after the migration processing.

It is assumed that an EVOL creation instruction is issued with respect to the PVOL 8 through the cluster view 104 after the new SS-VOL 3 of the PVOL 8 is created, for example, from a reason such as a function of the node #2 being used instead of the node #1. The EVOL creation instruction is received by the node #2. EVOL creating processing is performed in response to the EVOL creation instruction. The EVOL creating processing is in the following manner, for example. That is, on the basis of the global management table #2, the node #2 specifies the SS-VOLs (2) and (3) in the node #1 among all SS-VOLs associated to the PVOL 8. The node #2 creates, in the node #2, EVOLs (4) and (5) respectively corresponding to the specified SS-VOLs (2) and (3). Information related to the EVOLs (4) and (5) is reflected on the local management table #2 and the global management table #2 (see FIG. 11). However, the cluster view 104 does not change before and after the EVOL creating processing. That is, regardless of existence/non-existence of an EVOL, there is no change in a VOL configuration such as existence of three SS-VOLs 1, 2, and 3 with the PVOL 8 as the parent VOL in the storage cluster as a whole.

Figure 12:
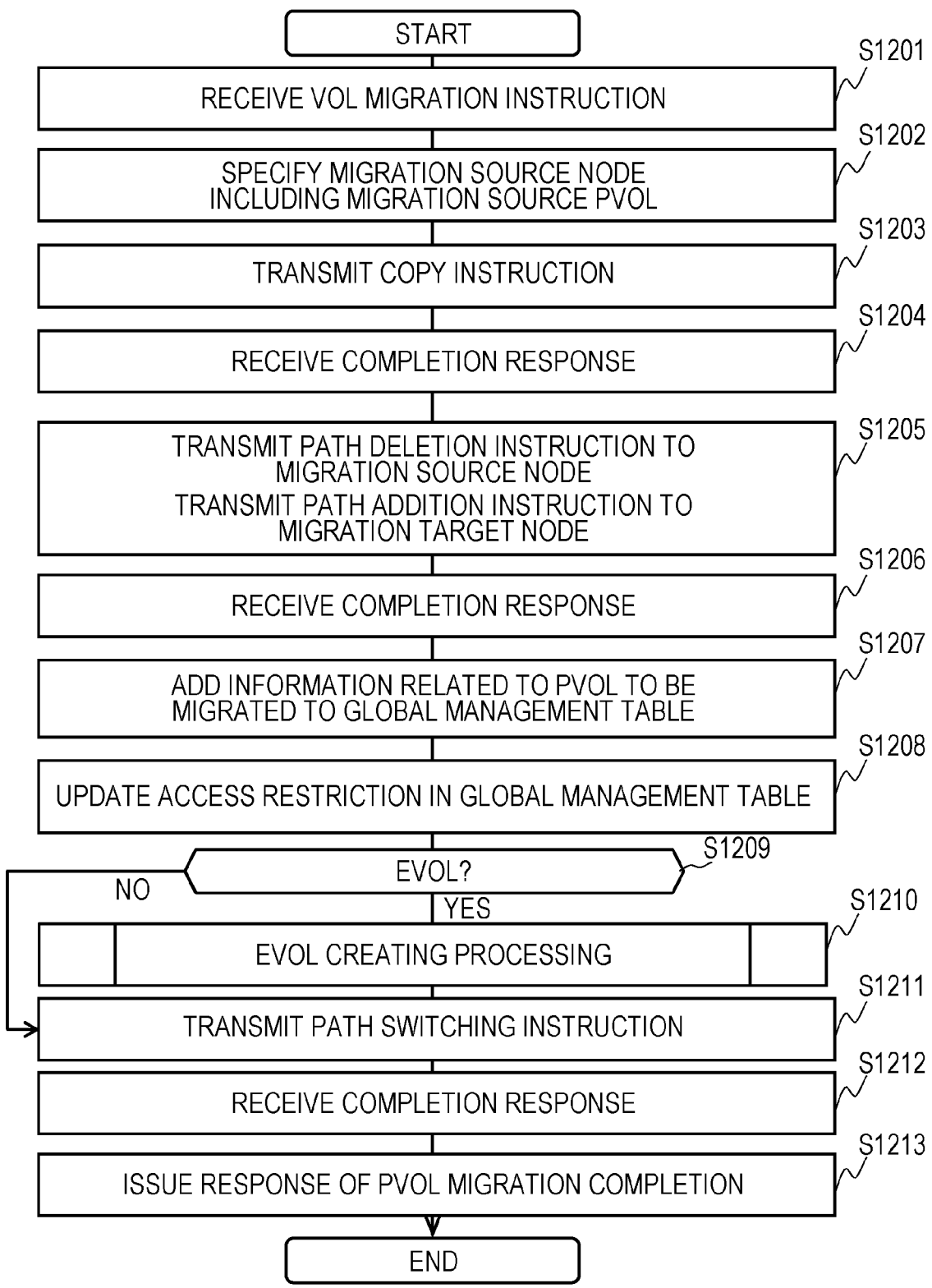
FIG. 12 is a flowchart illustrating a flow of the migration processing.

FIG. 12 is a flowchart illustrating a flow of migration processing performed in response to a VOL migration instruction.

In a case where a VOL migration instruction is received (S1201), the cluster management program #2 refers to a global management table and specifies a node including a VOL corresponding to a global VOL-ID of a VOL specified in the VOL migration instruction (S1202). It is assumed that the specified node is the node #1. Also, when the VOL is a PVOL, a local VOL-ID of the PVOL is specified. Also, when the VOL is an SS-VOL, a local VOL-ID of a PVOL that is a parent VOL of the SS-VOL is specified. The PVOL is a migration source PVOL. A node ID of a migration target node may be designated by the VOL migration instruction, or the node #2 that is a master node may be a migration target node.

The cluster management program #2 transmits a PVOL copy instruction to a copy program #1 of the node #1 (S1203). In response to the copy instruction, the copy program #1 copies data from the migration source PVOL to a migration target PVOL prepared in the node #2. The migration target PVOL may be a VOL prepared in response to the instruction from the copy program #1. In a case where the copy is ended, the copy program #1 returns a completion response. The cluster management program #2 receives the completion response from the copy program #1 (S1204).

The cluster management program #2 transmits a path deletion instruction to a path management program #1 of the migration source node #1, and transmits a path addition instruction to a path management program #2 of the migration target node #2 (S1205). Accordingly, a path connecting a PVOL (1) and a host #1 (host permitted to access PVOL (1)) is deleted (for example, path between PVOL (1) of node #1 and host #1 is deleted). Also, a path connecting a PVOL (2) of the node #2 and the host #1 is created. Note that such path deletion and path addition may be performed in cooperation with the host #1, for example, when the path management program #1 that receives the path deletion instruction instructs the host #1 to delete a path and the path management program #2 that receives the path addition instruction instructs the host #1 to add a path. When the path deletion is ended, the path management program #1 returns a completion response. When the path addition is ended, the path management program #2 returns a completion response. The cluster management program #2 receives the completion responses from the path management programs #1 and #2 (S1206).

The cluster management program #2 adds information related to a PVOL to be migrated in the storage cluster to the global management table #2 (and local management table #2) (S1207). For example, according to an example illustrated in FIG. 7 to FIG. 9, a node ID and a local VOL-ID corresponding to the PVOL 8 are updated from "1" and "1" to "2" and "2." Also, information related to the PVOL (2) corresponding to the PVOL 8 is recorded in the local management table #2.

The cluster management program #2 updates access restriction 507 and 609 (S1208). More specifically, the cluster management program #2 updates access restriction 507 and 609 of the PVOL (2) to "permission to the host #1." Note that in the node #1, access restriction 507 of the PVOL (1) is updated to "access prohibited" (see FIG. 9).

The cluster management program #2 determines whether to create an EVOL (S1209). In a case where there is a correspondence to any of the following, a determination result in S1209 is true.

An instruction for EVOL creation is included in the VOL migration instruction in S1201.
An EVOL creation mode indicating whether to create an EVOL of an SS-VOL in a migration source node #1 in migration processing of a PVOL is on.
The migration source node #1 is to be replaced with a node #2 eventually.

In a case where the determination result in S1209 is true (S1209: YES), the cluster management program #2 performs EVOL creating processing in FIG. 14 (S1210).

The cluster management program #2 transmits a path switching instruction to the path management program #2 (S1211). In response to the path switching instruction, the path management program #2 performs path switching by giving an instruction for activating an added path to the host #1 (such as path management program 303). When switching of the path is ended, the path management program #2 returns a completion response. The cluster management program #2 receives the completion response (S1212).

The cluster management program #2 returns a completion response with respect to the VOL migration instruction in S1201 (S1213).

When an EVOL is created, an access from a host to an SS-VOL in the migration source node #1 is performed through the migration target node #2. Accordingly, it is possible for the node #2 to virtually manage all VOLs in the storage cluster, and it can be expected that a single node #2 is configured as the storage system 100.

Figure 13:
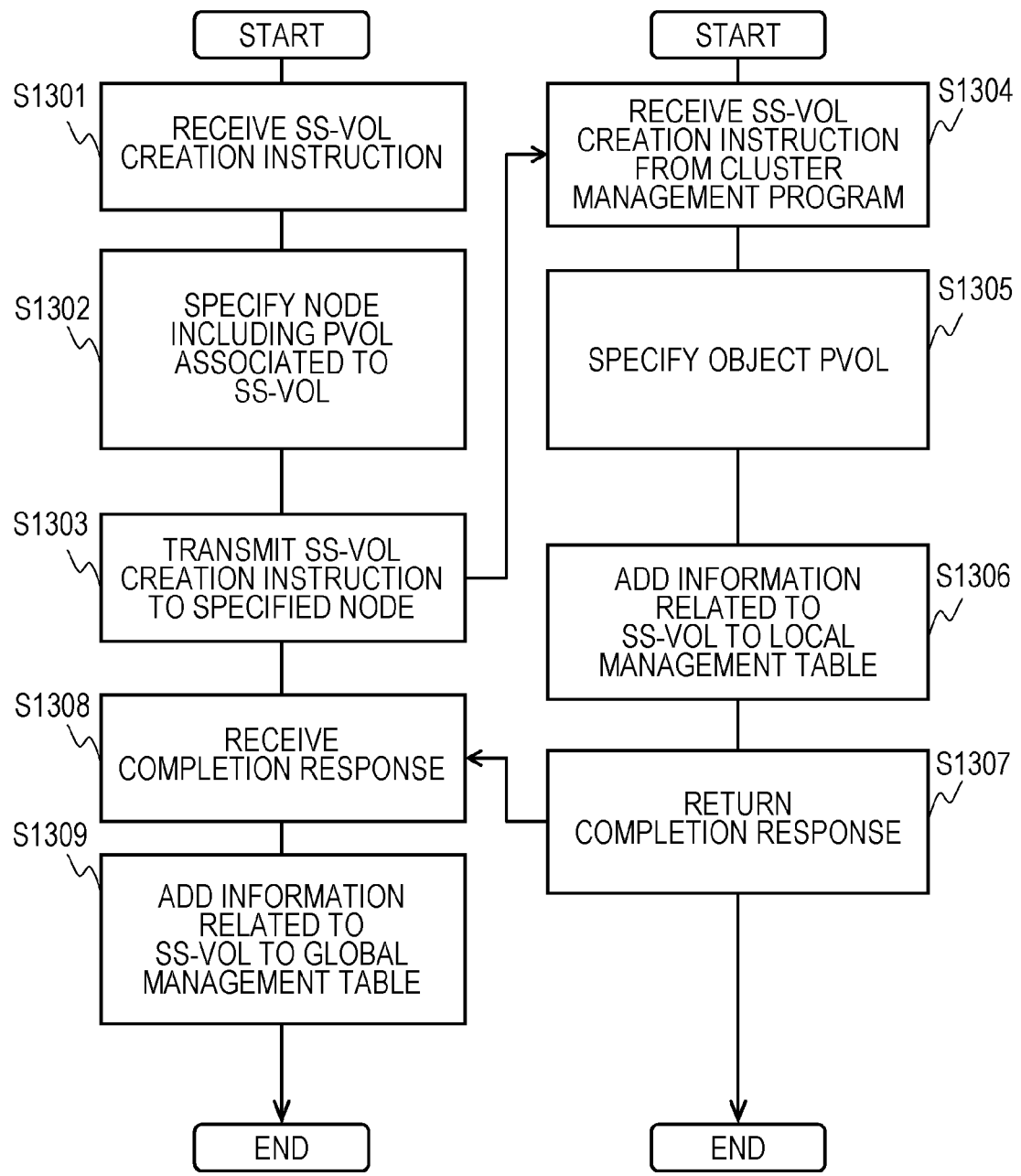
FIG. 13 is a flowchart illustrating a flow of SS-VOL creating processing.

FIG. 13 is a flowchart illustrating a flow of SS-VOL creating processing.

The cluster management program #2 receives a snapshot creation instruction, for example, through the cluster view 104 (S1301). In the snapshot creation instruction, for example, a global VOL-ID of a PVOL that is an object of snapshot creation is designated. The cluster management program #2 refers to the global management table #2 and specifies a node including the PVOL that is an object of snapshot creation on the basis of the global VOL-ID (S1302). For example, after the migration processing exemplified in FIG. 7, a node specified in S1302 is the node #2. The cluster management program #2 transmits an SS-VOL creation instruction to a snapshot program #2 of the specified node #2 (S1303). In the SS-VOL creation instruction, for example, a local VOL-ID of the PVOL that is the object of snapshot creation is designated.

The snapshot program #2 receives an SS-VOL creation instruction from the cluster management program #2 (S1304). The snapshot program #2 refers to the local management table #2 and specifies an object PVOL on the basis of the local VOL-ID of the PVOL that is the object of snapshot creation (S1305). The snapshot program #2 adds information related to a new SS-VOL to the local management table #2 (S1306). The snapshot program #2 returns a completion response (S1307).

The cluster management program #2 receives the completion response from the snapshot program #2 (S1308). The cluster management program #2 adds information related to the new SS-VOL to the global management table #2 (S1309).

Figure 14:
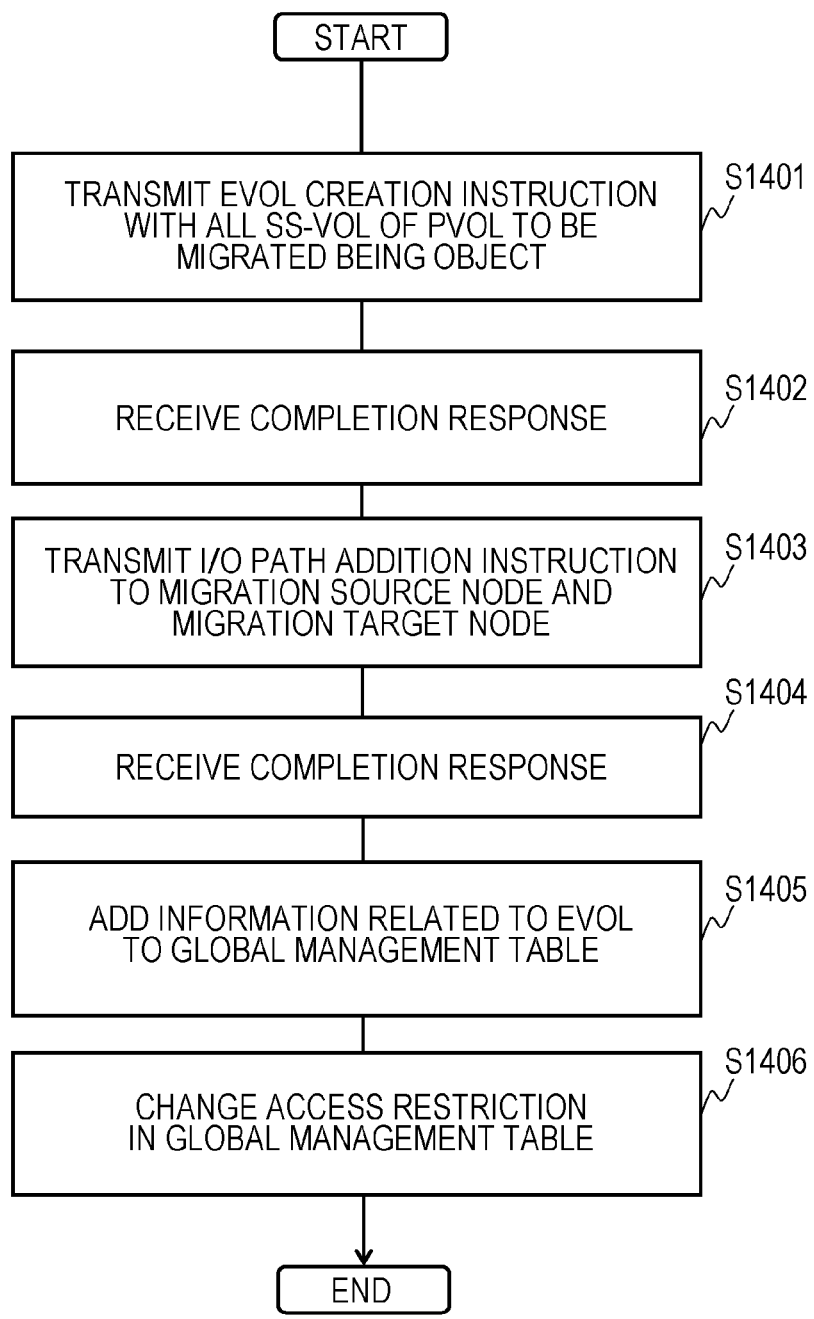
FIG. 14 is a flowchart illustrating a flow of the EVOL creating processing.

FIG. 14 is a flowchart illustrating a flow of EVOL creating processing.

The cluster management program #2 transmits, to an EVOL management program #2, an EVOL creation instruction in which all SS-VOLs in the migration source node #1 with respect to a PVOL to be migrated are objects (S1401). In the EVOL creation instruction, for example, a local VOL-ID of each of the all SS-VOLs in the migration source node #1 with respect to the PVOL to be migrated is designated. In response to the EVOL creation instruction, the EVOL management program #2 creates EVOLs respectively corresponding to the all SS-VOLs in the migration source node #1 with respect to the PVOL to be migrated and returns a completion response. The cluster management program #2 receives the completion response from the EVOL management program #2 (S1402).

The cluster management program #2 transmits a path deletion instruction to the path management program #1 of the migration source node #1, and transmits a path addition instruction to the path management program #2 of the migration target node #2 (S1403). Accordingly, a path connecting an SS-VOL (1) of the node #1 and the host #1 is deleted. Also, a path connecting an EVOL of the node #2 and the host #1 is created. When the path deletion is ended, the path management program #1 returns a completion response. When the path addition is ended, the path management program #2 returns a completion response. The cluster management program #2 receives the completion responses from the path management programs #1 and #2 (S1404).

The cluster management program #2 adds information related to the created EVOL (see, for example, FIG. 11) to the global management table #2 (and local management table #2) (S1405). Also, the cluster management program #2 sets access restriction 507 and 609 of the EVOL to "permission to the host #1" (S1406).

Figure 15:
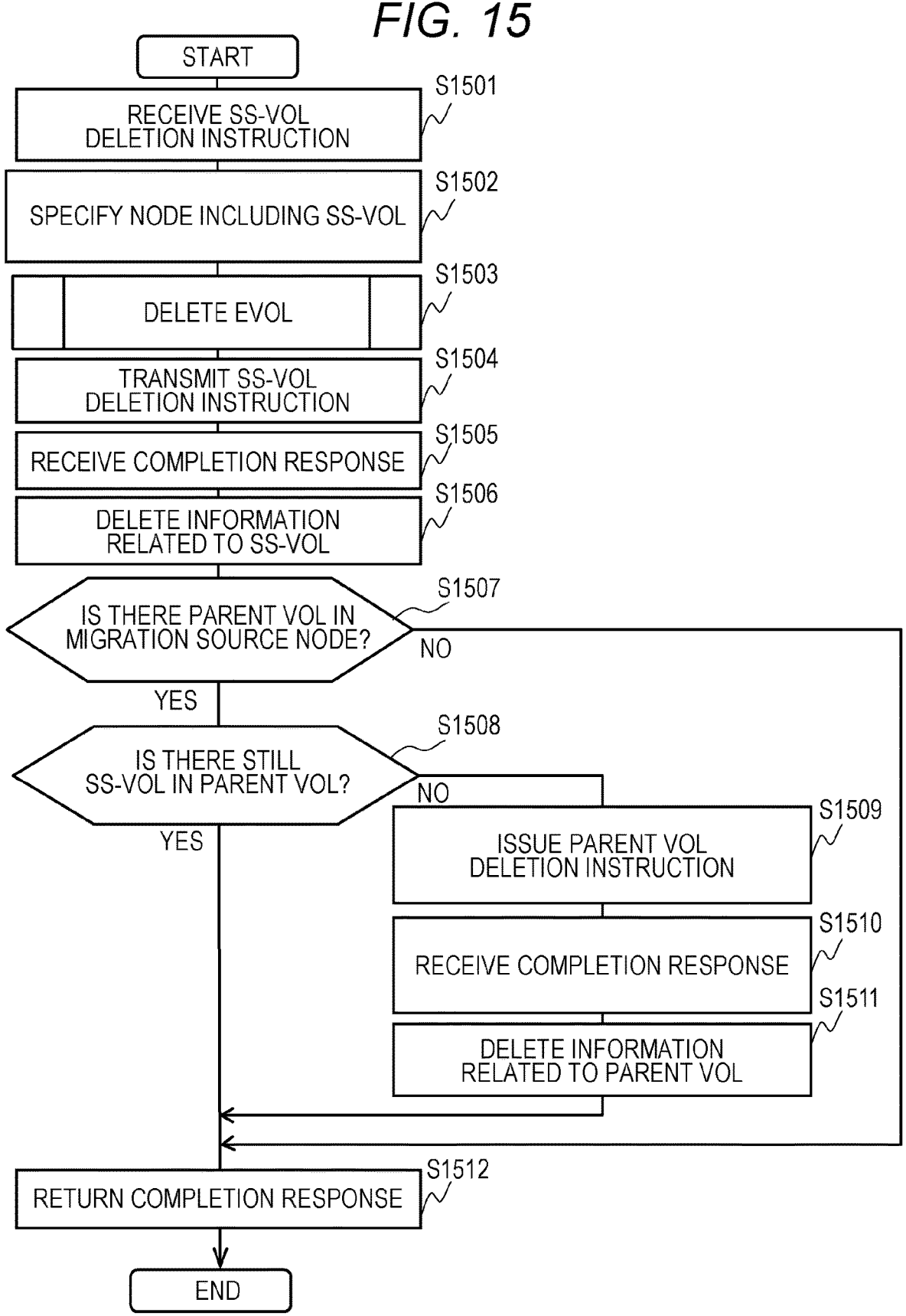
FIG. 15 is a flowchart illustrating a flow of SS-VOL deletion processing.

FIG. 15 is a flowchart illustrating a flow of SS-VOL deletion processing performed in response to a deletion instruction designating a global VOL-ID of an SS-VOL.

The cluster management program #2 receives an SS-VOL deletion instruction, for example, through the cluster view 104 (S1501). The cluster management program #2 refers to the global management table #2 and specifies a node including an SS-VOL corresponding to a global VOL-ID (object node in description of FIG. 15 and FIG. 16) (S1502). Subsequently, the cluster management program #2 starts EVOL deletion processing (S1503).

After S1503, the cluster management program #2 transmits an SS-VOL deletion instruction to a snapshot program 403 of the object node (S1504). In the SS-VOL deletion instruction, for example, a local VOL-ID of an SS-VOL to be deleted is designated. In response to the SS-VOL deletion instruction, the snapshot program 403 deletes the designated SS-VOL from the object node and returns a completion response. The cluster management program #2 receives the completion response from the snapshot program 403 of the object node (S1505). The cluster management program #2 deletes information related to the SS-VOL to be deleted from the global management table #2 (S1506).

The cluster management program #2 refers to the global management table #2 and determines whether a parent VOL of the SS-VOL to be deleted is in the migration source node (S1507). In a case where a determination result in S1507 is false (S1507: NO), the cluster management program #2 returns a completion response with respect to the deletion instruction in S1501 (S1512).

In a case where the determination result in S1507 is true (S1507: YES), the cluster management program #2 refers to the global management table #2 and determines whether a different SS-VOL is still associated to the parent VOL of the SS-VOL to be deleted (S1508). In a case where a determination result in S1508 is true (S1508: YES), the cluster management program #2 returns a completion response with respect to the deletion instruction in S1501 (S1512).

In a case where the determination result in S1508 is false (S1508: NO), the cluster management program #2 transmits, to an I/O program 401 of the object node, a deletion instruction for the parent VOL of the SS-VOL to be deleted (S1509). In response to the deletion instruction, the I/O program 401 deletes the parent VOL of the SS-VOL to be deleted and returns a completion response. The cluster management program #2 receives the completion response from the I/O program 401 (S1510). The cluster management program #2 deletes information related to the deleted parent VOL from the global management table #2 (S1511).

According to FIG. 15, in a case where the number of SS-VOLs associated to a migration source PVOL becomes zero in a migration source node, the migration source PVOL is deleted in addition to the SS-VOL. Accordingly, it is possible to reduce a used storage capacity of the whole storage system 100 and to maintain a restorable state since a PVOL remains in a migration target node.

Figure 16:
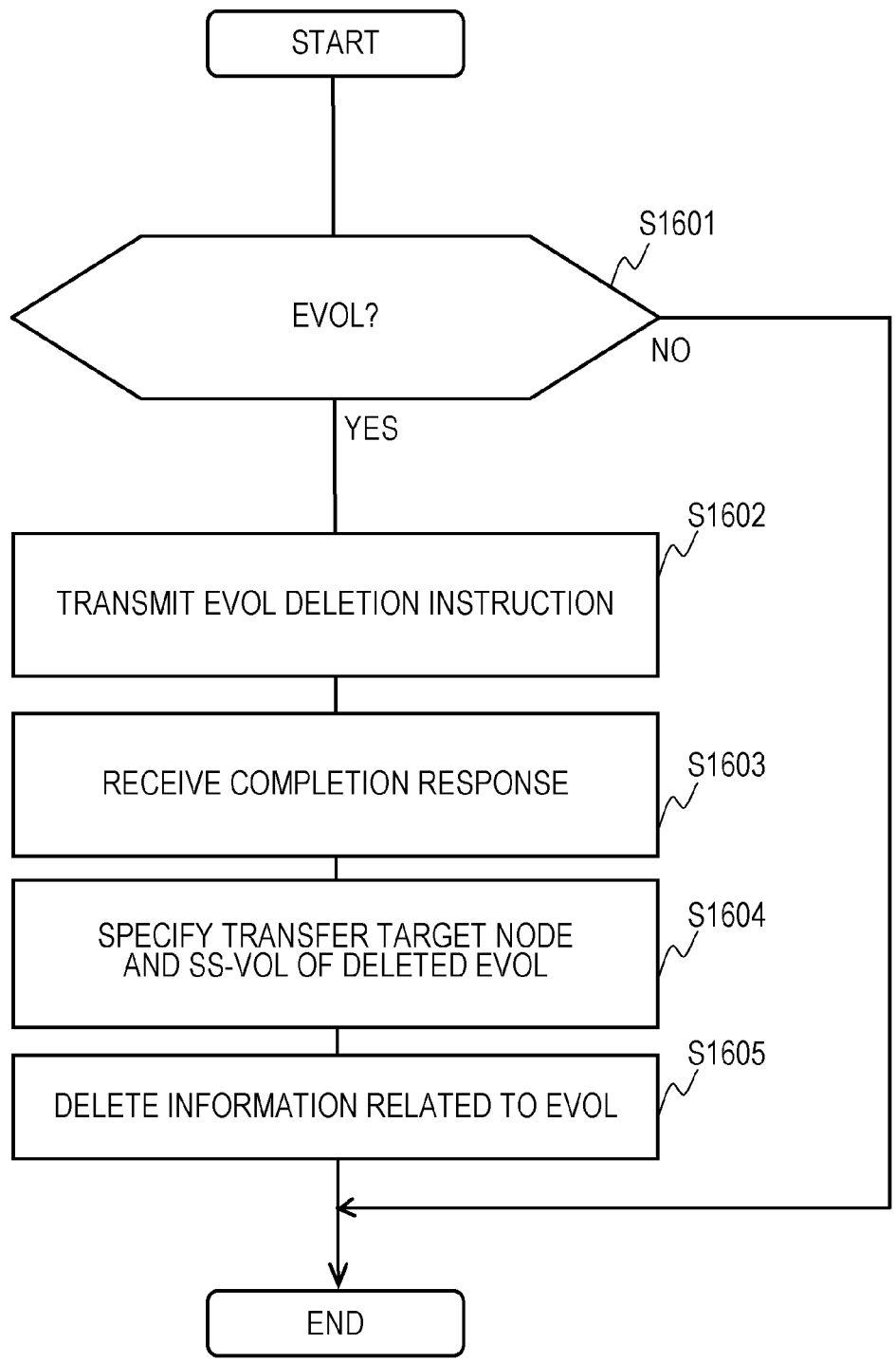
FIG. 16 is a flowchart illustrating a flow of EVOL deletion processing (S1503 in FIG. 15)

FIG. 16 is a flowchart illustrating a flow of the EVOL deletion processing (S1503 in FIG. 15).

The cluster management program #2 refers to the global management table #2 and determines whether an EVOL corresponds to an SS-VOL to be deleted (S1601). In a case where a determination result in S1601 is false (S1601: NO), the processing is ended.

In a case where the determination result in S1601 is true (S1601: YES), the cluster management program #2 transmits a deletion instruction designating an EVOL, which corresponds to the SS-VOL to be deleted, to an EVOL management program 406 of a node including the EVOL (S1602). In response to the deletion instruction, the EVOL management program 406 deletes the designated EVOL and returns a completion response. The cluster management program #2 receives the completion response from the EVOL management program #406 (S1603).

The cluster management program #2 refers to the global management table #2 and specifies a transfer target node (node including SS-VOL to be deleted) and the SS-VOL to be deleted of the deleted EVOL (S1604). The cluster management program #2 deletes information related to the deleted EVOL from the global management table #2 (1605).

Figure 17:
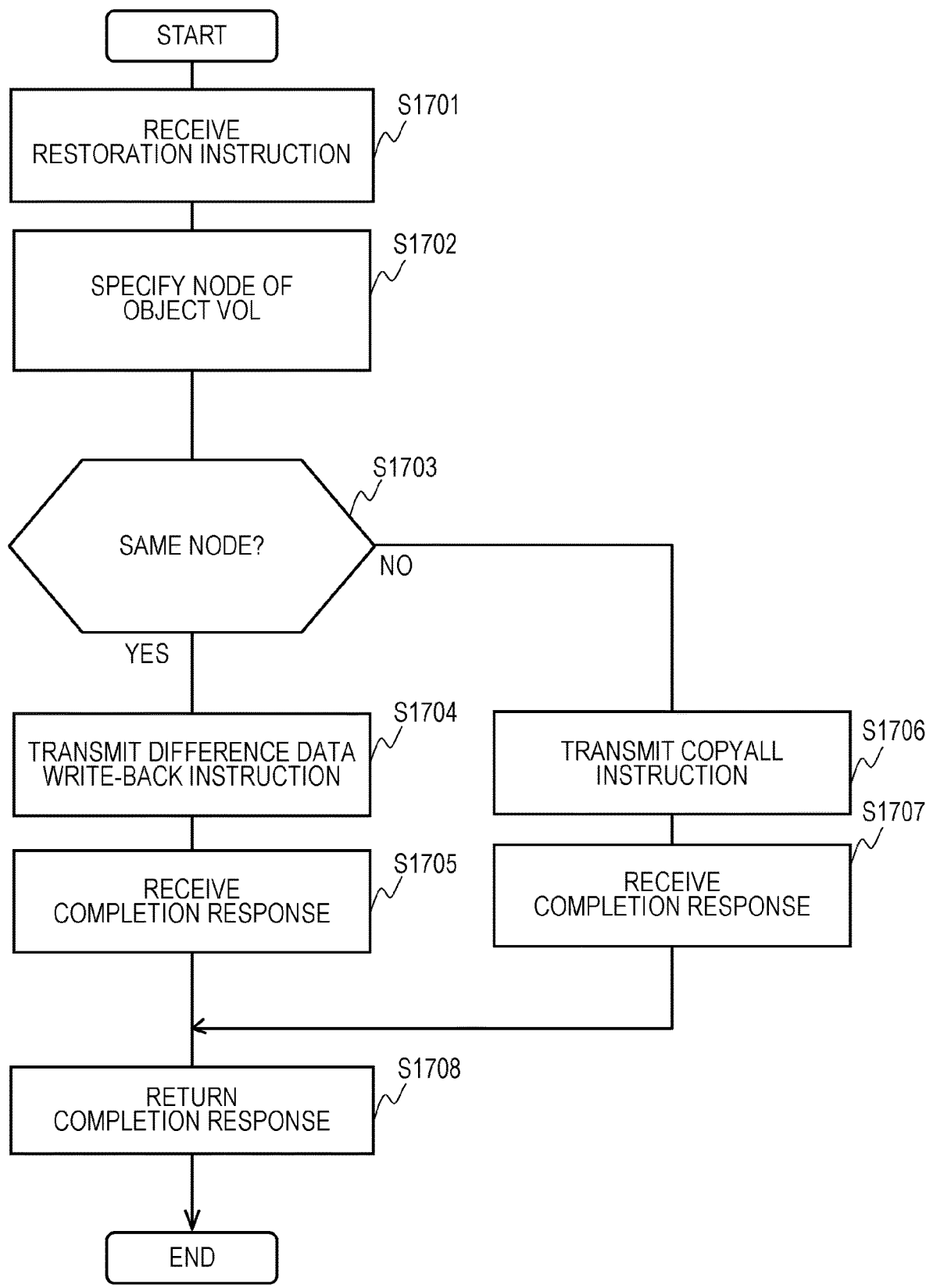
FIG. 17 is a flowchart illustrating a flow of restoration processing.

FIG. 17 is a flowchart illustrating a flow of restoration processing.

The cluster management program #2 receives a restoration instruction designating a global VOL-ID of an SS-VOL, for example, through the cluster view 104 (S1701).

The cluster management program #2 refers to the global management table #2 and specifies a node including the SS-VOL to be restored ("object node" in description of FIG. 17 in the following) on the basis of the global VOL-ID (S1702).

The cluster management program #2 determines whether the SS-VOL to be restored and a PVOL that is a parent VOL thereof (PVOL in storage cluster) are in the same node, that is, whether the PVOL as the parent VOL of the SS-VOL to be restored is in the object node (S1703).

In a case where a determination result in S1703 is true (S1703: YES), the cluster management program #2 transmits a write-back instruction for difference data (data in SS-VOL to be restored) to a snapshot program 403 of the object node (S1704). In response to the write-back instruction, the snapshot program 403 writes the difference data back to the PVOL and returns a completion response. The cluster management program #2 receives the completion response from the snapshot program 403 of the object node (S1705). Subsequently, the cluster management program #2 returns a completion response with respect to the restoration instruction in S1701 (S1708).

In a case where a determination result in S1703 is false (S1703: NO), the cluster management program #2 transmits, to a copy program 404 of the object node, a copyall instruction for a migration target node of the SS-VOL to be restored (S1706). In response to the copyall instruction, the copy program 404 copies, to the migration target node, difference data in the SS-VOL to be restored and all pieces of data other than difference data among pieces of data in the PVOL of the object node, and returns a completion response. The cluster management program #2 receives the completion response from the copy program 404 of the object node (S1707). Subsequently, the cluster management program #2 returns a completion response with respect to the restoration instruction in S1701 (S1708).

In the present embodiment, a configuration in which two or more SS-VOLs are lined up in a cascade with a PVOL at a head can be employed as a VOL configuration.

Figure 18:
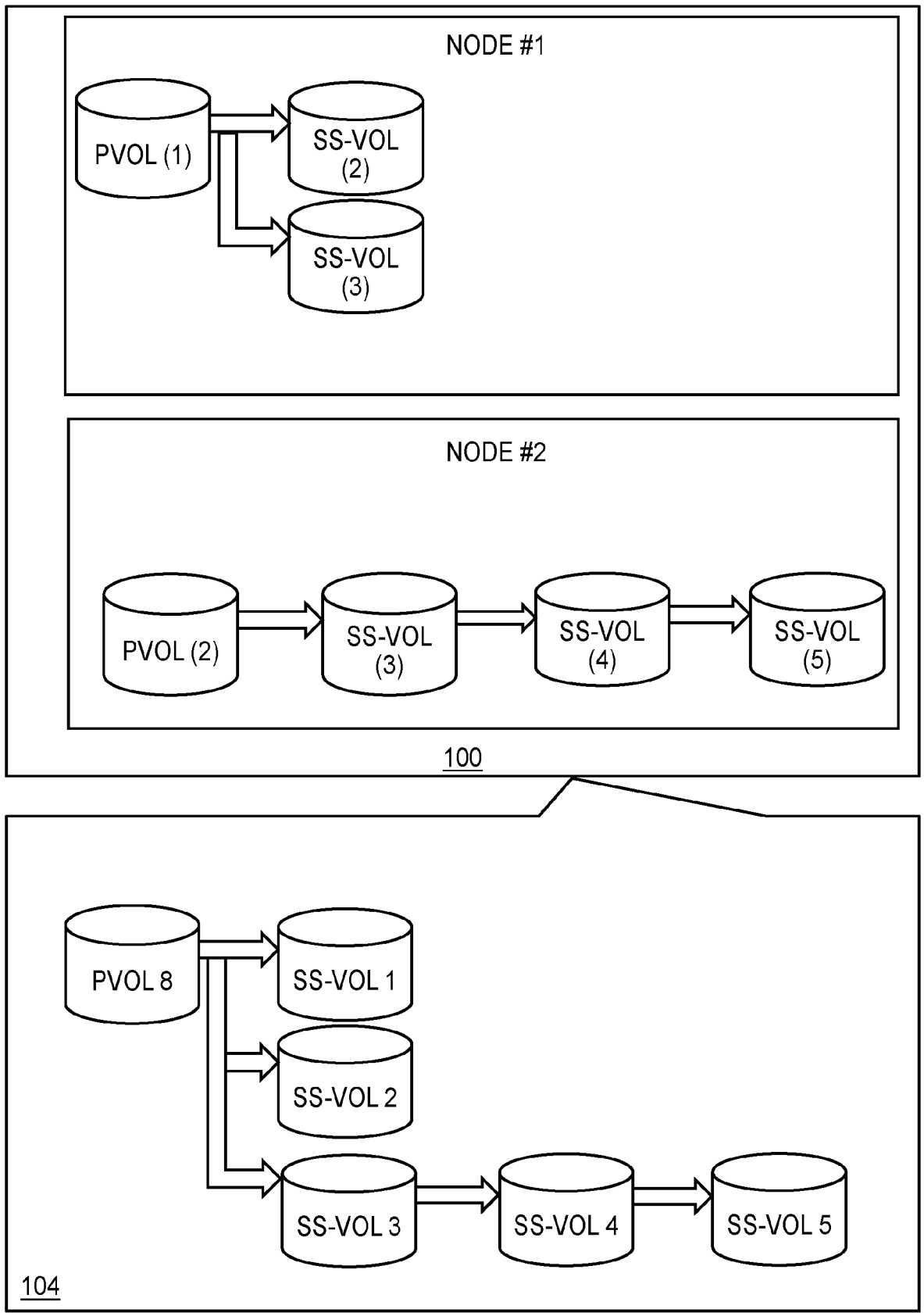
FIG. 18 is a view illustrating a local VOL configuration and a global VOL configuration after cascade connection is made after the migration processing exemplified in FIG. 7.

FIG. 18 is a view illustrating a local VOL configuration and a global VOL configuration after cascade connection is made after the migration processing exemplified in FIG. 7. FIG. 19 is a view illustrating the local management tables #1 and #2 and the global management table #2 after the cascade connection is made after the migration processing.

It is possible to newly associate two or more SS-VOLs (3) to (5) in a cascade to a PVOL (2) after migration processing. More specifically, it is possible to set a certain existing SS-VOL as a parent VOL of a new SS-VOL. SS-VOLs in a cascade configuration may exist in a migration source node #1 from the beginning. Generation numbers 504 and 606 corresponding to an SS-VOL a parent VOL of which is an existing SS-VOL are numbers with a generation number of the existing SS-VOL being 0. Thus, for example, in a case where an SS-VOL with respect to the existing SS-VOL is created for the first time, each of generation numbers 504 and 606 of the SS-VOL created first is "1" (see FIG. 19).

Note that any of (X) to (Z) in the following can be employed with respect at least to a cascade configuration.

<(X) Protection Precedence>
In a case of creating an SS-VOL with respect to a PVOL in a cascade configuration, a node #2 creates the SS-VOL in the node #2 where the PVOL exists. A generation number of the created SS-VOL can be a number in consideration of a generation number of an existing SS-VOL.

In a case of creating an SS-VOL with respect to a certain SS-VOL in a cascade configuration, the node #2 creates an SS-VOL in a node where the certain SS-VOL exists. A generation number of the created SS-VOL can be a number in consideration of a generation number of the SS-VOL set as a parent VOL.

In a case where a PVOL in a cascade configuration is set to be deleted and there is at least one descendent SS-VOL in the PVOL, the node #2 does not execute deletion (for example, returns error to user (example of instruction source of deletion)). The node #2 does not accept deletion of the PVOL until all descendent SS-VOLs are deleted. Accordingly, it is possible to prevent inability to restore a PVOL in a generation corresponding to a remaining SS-VOL.

In a case where an SS-VOL in a cascade configuration is set to be deleted but there is at least one descendent SS-VOL in the SS-VOL to be deleted, the node #2 does not execute deletion (for example, return error to user). The node #2 does not accept deletion of a parent SS-VOL until all descendent SS-VOLs are deleted. Accordingly, it is possible to prevent inability to restore a PVOL in a generation corresponding to a remaining SS-VOL.

In a case where restoration is executed with respect to an ancestor PVOL from an SS-VOL in a cascade configuration, the node #2 performs the following processing. That is, in a case where an SS-VOL existing in a migration source node #1 is to be restored, the node #2 performs write-back of all pieces of data. In a case where an SS-VOL existing in a migration target node #2 is to be restored, the node #2 performs write-back of difference data.

<(Y) Instruction Precedence>
In a case of creating an SS-VOL with respect to a PVOL in a cascade configuration, a node #2 creates the SS-VOL in the node #2 where the PVOL exists. A generation number of the created SS-VOL can be a number in consideration of a generation number of an existing SS-VOL.

In a case of creating an SS-VOL with respect to a certain SS-VOL in a cascade configuration, the node #2 creates an SS-VOL in a node where the certain SS-VOL exists. A generation number of the created SS-VOL can be a number in consideration of a generation number of the SS-VOL set as a parent VOL.

In a case where a PVOL in a cascade configuration is set to be deleted, and in a case where at least one descendent SS-VOL is in the PVOL, the node #2 deletes the PVOL and all descendent SS-VOLs of the PVOL.

In a case where an SS-VOL in a cascade configuration is set to be deleted but there is at least one descendent SS-VOL in the SS-VOL to be deleted, the node #2 deletes the SS-VOL and all descendent SS-VOLs of the SS-VOL.

In a case where restoration is executed with respect to an ancestor PVOL from an SS-VOL in a cascade configuration, the node #2 performs the following processing. That is, in a case where an SS-VOL existing in a migration source node #1 is to be restored, the node #2 performs write-back of all pieces of data. In a case where an SS-VOL existing in a migration target node #2 is to be restored, the node #2 performs write-back of difference data.

<(Z) Selection of Protection Precedence and Instruction Precedence>
The node #2 manages whether a protection mode is on or off. In a case where the protection mode is on, "(X) protection precedence" described above is employed. In a case where the protection mode is off, "(Y) instruction precedence" described above is employed. For example, in a case where the protection mode is off, the node #2 deletes a PVOL to be deleted and all descendent SS-VOLs of the PVOL or deletes an SS-VOL to be deleted and all descendent SS-VOLs of the SS-VOL. Accordingly, it is possible to provide flexible storage control.

In the above, an embodiment of the present invention has been described. However, this is an example for a description of the present invention and is not to limit the scope of the present invention only to this embodiment. The present invention can be performed in various different forms. For example, a generation number of each SS-VOL in a storage cluster may be displayed on a cluster view 104.

What is claimed is:
1. A storage control method comprising:
    specifying, as a migration source primary volume, a primary volume to which one or more snapshot volumes are associated in a storage cluster recognized as one storage device with respect to a host system, each of the one or more snapshot volumes associated to the migration source primary volume storing difference data as a difference from a migration source primary volume in a generation corresponding to the snapshot volume;

performing migration processing of migrating the migration source primary volume from among the migration source primary volume and a part of the snapshot volumes from a migration source storage device, which is a storage device including the specified migration source primary volume and the one or more snapshot volumes, among a plurality of storage devices to a migration target storage device among the plurality of storage devices; and maintaining a volume configuration shown to the host system after the migration processing as a volume configuration shown to the host system before the migration processing by managing a migration target primary volume that is a primary volume migrated to the migration target storage device in the migration processing as a primary volume that is associated to the one or more snapshot volumes in the migration source storage device and that is in the storage cluster after the migration processing.

2. The storage control method according to claim 1, wherein a request for creating or deleting a volume with respect to the storage cluster is received from the host system on the basis of the volume configuration.

3. The storage control method according to claim 2, wherein in a case where a snapshot volume is newly created with respect to a primary volume in the storage cluster after the migration processing, a new snapshot volume associated to the primary volume is created in the migration target storage device.

4. The storage control method according to claim 3, wherein in a case where a primary volume in a generation corresponding to any snapshot volume among the one or more snapshot volumes existing before the migration processing is to be restored, difference data in the snapshot volume corresponding to the generation and all pieces of data referred to by the snapshot volume corresponding to the generation are copied from the migration source storage device to the migration target storage device, and in a case where a primary volume in a generation corresponding to the snapshot volume created after the migration processing is to be restored, difference data in the snapshot volume corresponding to the generation is copied in the migration target storage device.

5. The storage control method according to claim 1, wherein a snapshot volume to be deleted in the storage cluster is deleted, and the migration source primary volume is also deleted in a case where the number of snapshot volumes associated to the migration source primary volume becomes zero in the migration source storage device when at least one snapshot volume with respect to the primary volume is deleted after the migration processing.

6. The storage control method according to claim 5, wherein at least one of (a) and (b) in the following is performed (a) in a case where a primary volume to which at least one snapshot volume is associated since not all snapshot volumes are deleted is to be deleted, deletion of the primary volume is not executed, and (b) in a case where a snapshot volume to which a relatively new snapshot volume is associated is to be deleted, deletion of the snapshot volume is not executed.

7. The storage control method according to claim 6, wherein (a) and (b) are performed in a case where a protection mode is on, and the following is performed in a case where the protection mode is off, instead of (a), the primary volume to be deleted and all snapshot volumes associated to the primary volume to be deleted are deleted, and instead of (b), the snapshot volume to be deleted and all snapshot volumes associated to the snapshot volume are deleted.

8. The storage control method according to claim 1, further comprising specifying a storage device to which an I/O amount is relatively concentrated by measuring the I/O amount with respect to each of the plurality of storage devices, and specifying, in a case where there is a primary volume in the specified storage device, the primary volume as the migration source primary volume.

9. The storage control method according to claim 1, wherein in the volume configuration shown to the host system after the migration processing, the one or more snapshot volumes existing before the migration processing are one or more virtual volumes respectively associated, in the migration target storage device, to the one or more snapshot volumes of the migration source storage device.

10. A storage system as a storage cluster recognized as one storage device with respect to a host system, comprising:

a plurality of storage devices, wherein at least one of the plurality of storage devices specifies, as a migration source primary volume, a primary volume to which one or more snapshot volumes are associated in the storage cluster, each of the one or more snapshot volumes associated to the migration source primary volume storing difference data as a difference from a migration source primary volume in a generation corresponding to the snapshot volume, performs migration processing of migrating only the migration source primary volume from among the migration source primary volume and the one or more snapshot volumes from a migration source storage device, which is a storage device including the specified migration source primary volume and the one or more snapshot volumes, among the plurality of storage devices to a migration target storage device among the plurality of storage devices, and maintains a volume configuration shown to the host system after the migration processing as a volume configuration shown to the host system before the migration processing by managing a migration target primary volume that is a primary volume migrated to the migration target storage device in the migration processing as a primary volume that is associated to the one or more snapshot volumes in the migration source storage device and that is in the storage cluster after the migration processing.

11. A non-transitory computer-readable storage medium storing a computer program for causing a computer to execute specifying, as a migration source primary volume, a primary volume to which one or more snapshot volumes are associated in a storage cluster recognized as one storage device with respect to a host system, each of the one or more snapshot volumes associated to the migration source primary volume storing difference data as a difference from a migration source primary volume in a generation corresponding to the snapshot volume, and performing migration processing of migrating only the migration source primary volume from among the migration source primary volume and the one or more snapshot volumes from a migration source storage device, which is a storage device including the specified migration source primary volume and the one or more snapshot volumes, among a plurality of storage devices to a migration target storage device among the plurality of storage devices, and maintaining a volume configuration shown to the host system after the migration processing as a volume configuration shown to the host system before the migration processing by managing a migration target primary volume that is a primary volume migrated to the migration target storage device in the migration processing as a primary volume that is associated to the one or more snapshot volumes in the migration source storage device and that is in the storage cluster after the migration processing.

\* \* \* \* \*